United States Patent [19]

Stamp

[11] Patent Number: 5,383,523
[45] Date of Patent: Jan. 24, 1995

[54] WEEDING TOOL

[76] Inventor: Jerry R. Stamp, 3560 Springdale, Lambertville, Mich. 48144

[21] Appl. No.: 1,508

[22] Filed: Jan. 6, 1993

[51] Int. Cl.⁶ ............................. A01B 1/22; B25G 3/04
[52] U.S. Cl. ........................................ 172/378; 30/340
[58] Field of Search ............... 172/371, 378, 361; 56/DIG. 18; 30/340

[56] References Cited

U.S. PATENT DOCUMENTS

| D. 273,838 | 5/1984 | Buffington | 172/378 X |
|---|---|---|---|
| 534,199 | 2/1895 | Clouse | 172/378 X |
| 1,142,783 | 6/1915 | Eagan | . |
| 1,353,494 | 9/1920 | Risch | . |
| 1,494,557 | 5/1924 | Lumry et al. | . |
| 2,037,943 | 4/1936 | Stiehl et al. | 30/340 |
| 2,142,137 | 1/1939 | Leary | 30/340 |
| 2,538,442 | 1/1951 | Christie | 30/340 X |
| 2,868,503 | 1/1959 | DeLue | 254/132 |
| 3,061,270 | 10/1962 | Lowe | 254/132 |
| 3,138,365 | 6/1964 | Rundle | 254/132 |
| 3,865,348 | 2/1975 | Close | 254/132 |
| 4,147,918 | 4/1979 | Ritter et al. | 30/340 X |
| 4,178,684 | 12/1979 | Mightly | 30/340 X |
| 4,243,206 | 1/1981 | Heikkinen et al. | 254/132 |
| 5,033,782 | 7/1991 | Hirzel | 294/55.5 |

FOREIGN PATENT DOCUMENTS

| 769378 | 10/1967 | Canada | 172/378 |
|---|---|---|---|
| 963021 | 12/1949 | France | 30/340 |
| 2330294 | 6/1977 | France | 172/378 |
| 11124 | 8/1956 | Germany | 30/340 |

*Primary Examiner*—David H. Corbin
*Assistant Examiner*—Christopher J. Novosad
*Attorney, Agent, or Firm*—Willian Brinks Hofer Gilson & Lione

[57] ABSTRACT

A hand held weeding tool exhibits exceptional weed extraction capabilities due to its combination of elements. The weeding tool includes a straight handle, an elliptically curved body portion and a weeding head. The handle is cylindrical and is readily adapted to be gripped by the hand of a user and may be extended with an auxiliary handle. The body is configured to provide maximum mechanical advantage and removal force at the beginning of the extraction operation. The weeding head includes a plurality of parallel, closely spaced tines or spikes which readily engage the weed or plant and lifts it from the soil.

19 Claims, 2 Drawing Sheets

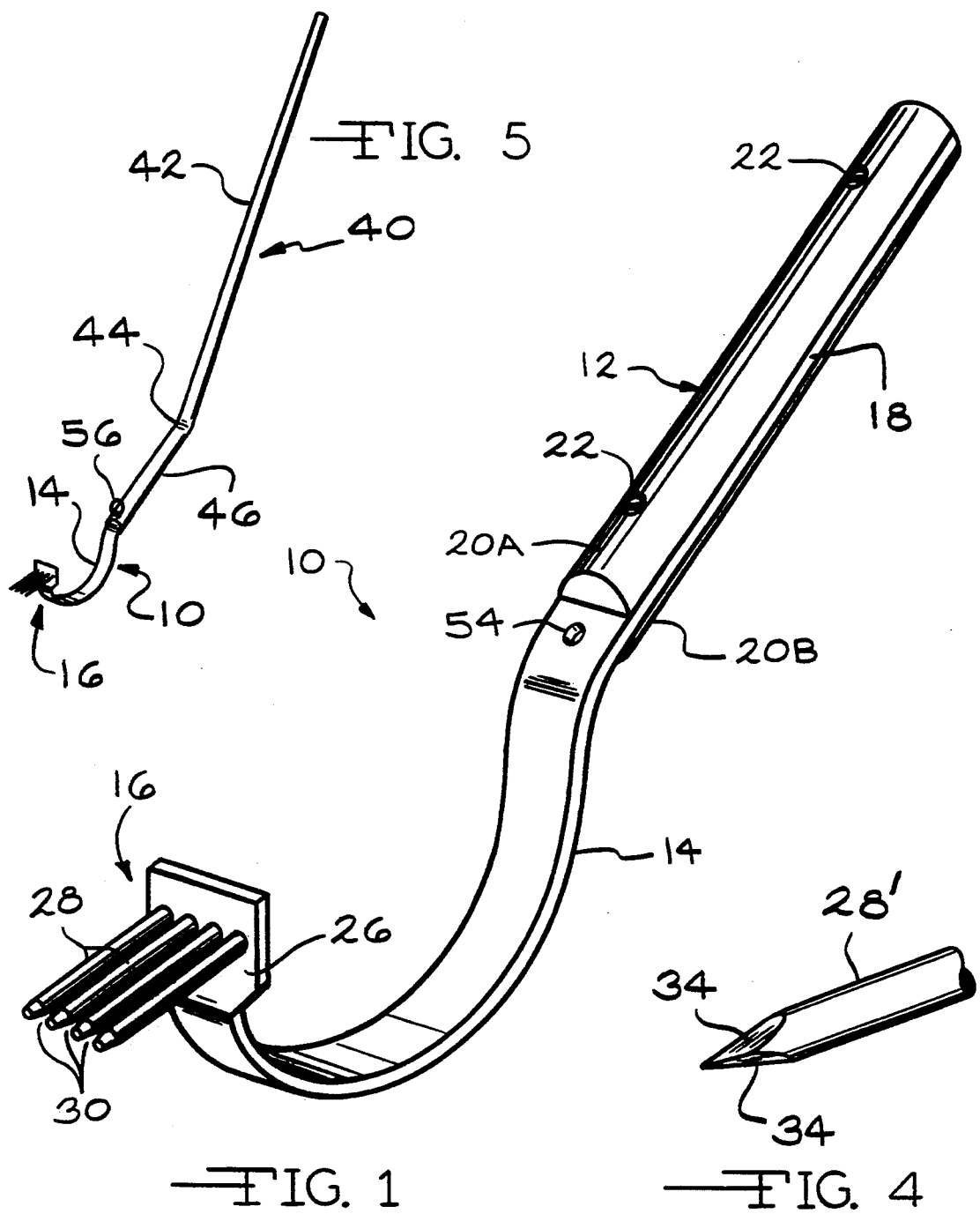

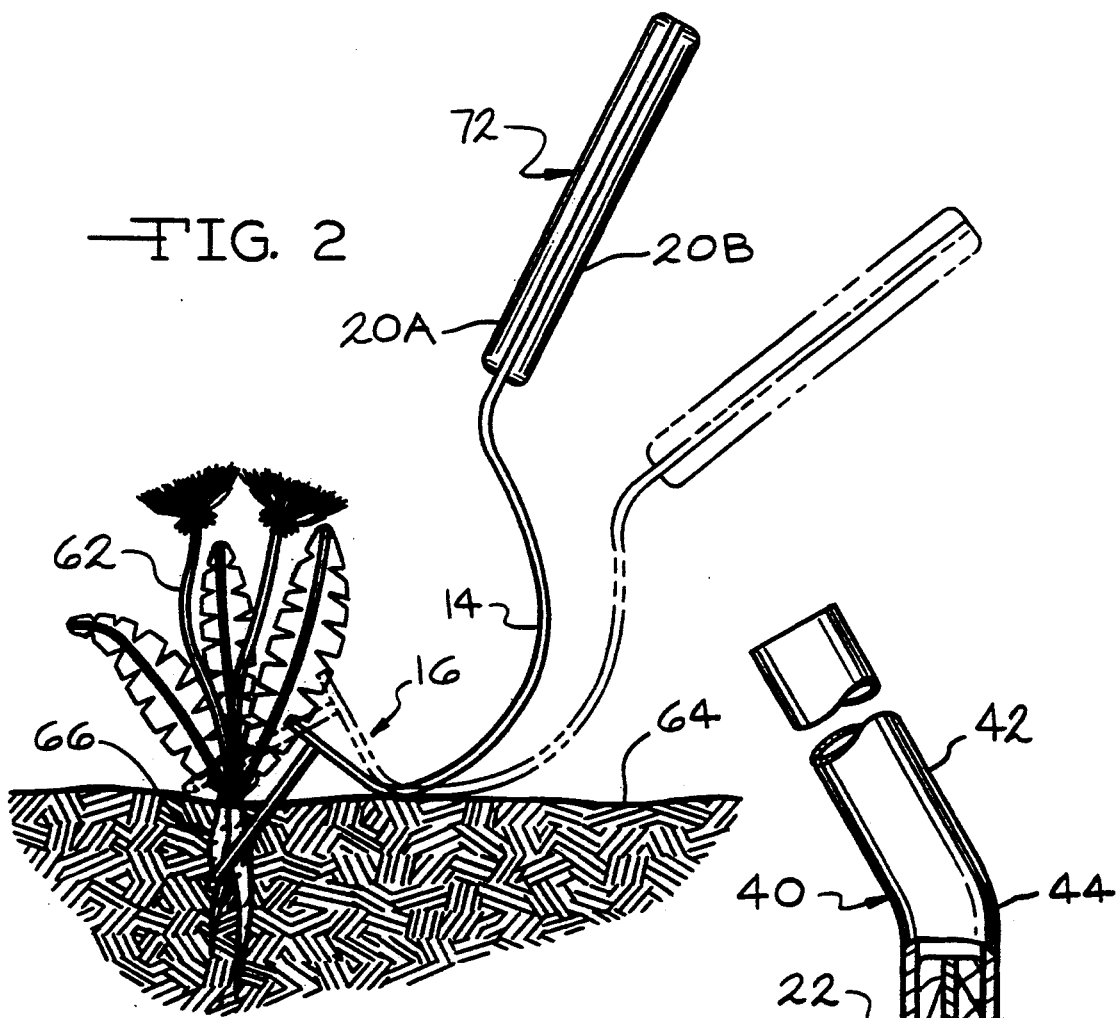
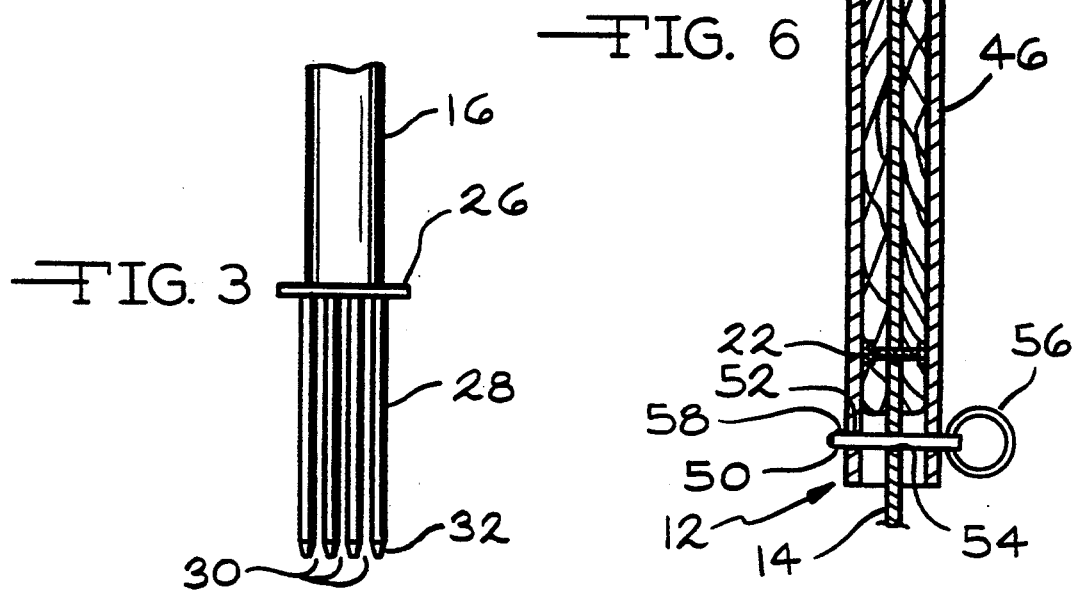

WEEDING TOOL

BACKGROUND OF THE INVENTION

The invention relates generally to weeding devices and more specifically to a manually held and operated lever type weed extraction device.

The goal of a yard or garden which contains only those desired plants and flowers has prompted the development of a broad range of products to eliminate unwanted flora. Both herbicides and mechanical means have been developed to eliminate same.

Mechanical devices range from products which loosen the earth to facilitate removal, through plant extractors, to devices which appear to only remove the upper, foliage portion of a plant.

U.S. Pat. No. 1,142,783 teaches an attachment for agricultural pitchforks. The attachment includes a plate having a pair of spaced-apart openings through which two pitchfork tines are received and a curved body which provides a fulcrum about which the pitchfork be pivoted. U.S. Pat. No. 1,353,494 presents a device having a similar function but which comprehends an angled metal strap which defines an acute angle. The device is attached to a shovel or other digging implement to provide a fulcrum.

Pat. No. 1,494,557 teaches a lawn weeder having three tapering, spaced apart tines, a manually engaged handle and a cylindrical fulcrum member disposed therebetween. Pat. No. 2,868,503 discloses a weeding tool having an outer plate member which is pivotally attached to an inner fork member and handle. The plate member is placed on the ground and the handle may be pivoted to raise the inner fork member and a weed engaged thereby.

Pat. No. 3,061,270 teaches a lawn and garden tool having sets of tines of various lengths and profiles. The tines are received within an elliptical base which is in turn secured to a handle. In U.S. Pat. No. 3,138,365 a weed puller is disclosed having a plurality of triangular tines, a curved metal strip or rocker and a flange whereby foot pressure may be applied to the tool. U.S. Pat. No. 3,865,348 discloses a similarly configured tool having only two tapering tines. The length of the handle suggests that this tool is intended exclusively for use by a standing operator.

U.S. Pat. No. 4,243,206 teaches a weed removing apparatus having a plurality of parallel tines which are disposed in a housing pivotally mounted within a yoke. A clean off plate may be slid along the tines to remove weeds, dirt, etc. Finally, U.S. Pat. No. 5,033,782 discloses a shovel for lifting weeds and softening the grounds which resembles a giant fork. A large number of spikes, i.e., approximately eight, are spaced one-quarter to one-half inches apart to catch weeds therebetween.

Review and examination of the foregoing prior art patents reveals that improvements in the art of weeding tools are both possible and desirable. For example, several of these tools include moving or pivotally interconnected parts which is undesirable in a lawn or garden tool. Such complexity also increases the price of the tool.

SUMMARY OF THE INVENTION

A hand held weeding tool exhibits exceptional weed extraction capabilities due to its combination of elements. The weeding tool includes a straight handle, a generally elliptically curved body portion and a weeding head. The handle is cylindrical and is readily adapted to be gripped by the hand of a user while the user is situated in a kneeling position. The elliptically curved body portion is configured to provide maximum mechanical advantage and removal force at the beginning of the extraction operation. The weeding head includes a plurality of parallel, closely spaced tines or spikes having tapered ends which readily engage the weed or plant. In the preferred embodiment, four tines are utilized.

If desired, the tool handle may be extended with an auxiliary handle so that the user may use the tool in a standing position. The auxiliary handle is hollow and telescopes over the cylindrical handle of the tool and is retained thereon by a transversely disposed linchpin.

The tool may be fabricated of, for example, welded steel components and wood handle inserts. It is a relatively uncomplicated tool which is not expensive to manufacture.

Thus it is an object of the present invention to provide a weeding tool which is both efficient and simple to use.

It is a further object of the present invention to provide a weeding tool having no moving parts.

It is a further object of the present invention to provide a weeding tool which is of straightforward design and is therefore relatively inexpensive and easy to manufacture.

It is a further object of the present invention to provide a weeding tool which provides significant mechanical advantage during the initial weed extraction action.

Further objects and advantages of the present invention will become apparent by reference to the following description and appended drawings.

BRIEF DESCRIPTION OF THE DRAWINGS

FIG. 1 is a perspective view of a weeding tool according to the present invention;

FIG. 2 is a side elevational view of a weeding tool according to the present invention wherein the weeding tool is shown in solid lines at the beginning of the weed extraction process and in phantom lines during the latter portion of the weed extraction process;

FIG. 3 is a plan view of the tines or spikes of a weeding tool according to the present invention;

FIG. 4 is a perspective view of an alternate embodiment of one of the tines or spikes of a weeding tool according to the present invention;

FIG. 5 is a perspective view of a weeding tool according to the present invention with an auxiliary handle disposed thereon; and FIG. 6 is a fragmentary, side elevational view with portions broken away of a weeding tool according to the present invention with the auxiliary handle disposed thereon.

DESCRIPTION OF THE PREFERRED EMBODIMENT

Referring now to FIG. 1, a weeding tool according to the present invention is illustrated and generally designated by the reference numeral 10. The weeding tool 10 includes a handle assembly 12, a curved body portion 14 and a weeding head assembly 16.

As illustrated in FIGS. 1 and 2, the handle assembly 12 is positioned generally about an elongate, flat extension 18 of the body portion 14 and includes a pair of elongate, semi-circular hand grips 20A and 20B which are secured in opposed relationship on opposite faces of the flat extension 18 of the body portion 14. The hand grips 20A and 20B are preferably between six and twelve inches (152.4 mm and 304.8 mm) in length and may be fabricated of any suitable durable and lightweight material such as wood or plastic such as polyethylene or acrylonitrile-butadiene-styrene (ABS). The hand grips 20A and 20B are secured to the flat extension 18 of the body portion 14 by rivets or screws 22 which extend between the hand grips 20A and 20B and through suitable apertures (not illustrated) in the flat extension 18. The rivets or screws 22 are recessed below the adjacent surface of the hand grips 20A and 20B such that they will not interfere with a comfortable grip on the handle assembly 12. The curvature and cross section of the hand grips 20A and 20B is such that when combined with the thickness of the flat extension 18 of the body portion 14, the handle assembly 12 defines a substantially circular cross section. Thus, the width of the hand grips 20A and 20B is preferably equal to the width of the flat extension 18 of the body portion 14.

Also as illustrated in FIGS. 1 and 2, the body portion 14 extends from the handle assembly 12 to the weeding head assembly 16 and may be a formed band or strap of metal such as aluminum or cold rolled steel. The body portion 14 may, for example, be between one-half and one inch (12.7 mm and 25.4 mm) in width and of suitable thickness, preferably, about one-eighth of an inch (3.2 mm) or more, depending upon the material, in order that it be sufficiently strong to accomplish the desired purposes of the weeding tool 10. If the body portion 14 is steel, it will preferably be heated and oil quenched after forming and drilling to achieve a Rockwell C hardness of between 25 and 30.

As illustrated in FIG. 2, the body portion 14 defines a portion of an ellipse when viewed in profile. The purposes and benefits of the elliptical shape will be described in further detail below.

Turning now to FIGS. 1 and 3, the weeding tool 10 further includes a weeding head assembly 16 which is coupled to or integrally formed with the body portion 14. The weeding head assembly 16 includes an enlarged terminal portion 26 preferably having a width between about one and one-half to two times the width of the body portion 14. The weeding head assembly 16 also includes a plurality, preferably four, plant engaging tines or spikes 28 which are secured by welding, brazing, autogenous bonding or other suitable fastening means, such as complementary male and female threads, to the enlarged terminal portion 26.

Optimum operation of the weeding tool 10 has been achieved by the tines or spikes 28 having a diameter of approximately three-sixteenths of an inch (4.8 mm) which are separated by spaces 30 of approximately three-sixteenths of an inch (4.8 mm). Depending upon the overall size of the weeding tool 10 and its intended purpose, the spikes may be as small as about one-eighth of an inch (3.2 mm) and as large as about one-quarter of an inch (6.3 mm). The spaces 30 between the spikes 28 may be likewise varied from about one-eighth of an inch (3.2 mm) to one-quarter of an inch (6.3 mm) and slightly larger. Good results have been achieved when the diameter of the tines or spikes 28 is substantially equal to the width of the spaces 30.

Preferably, the tines or spikes 28 are made of metal such as steel or aluminum and are approximately 3.25 inches (82.5 mm) in length but may be as short as two and one-half inches (63.5 mm) or as long as four inches (101.6 mm) for specific applications. As illustrated in FIG. 3, the spikes are disposed in parallel such that the width of the spaces 30 therebetween are constant along the length of the spikes 28. Each of the spikes 28 defines a tapered conical point 32 which assists entry of the spikes 28 into soil. The points 32 may either be sharp, i.e., shaped to define a tip or blunt, i.e., be frustoconical as illustrated. As illustrated in FIG. 2, the spikes 28 define a small acute angle relative to the axis of the handle assembly 12 of approximately 10°. This angle may be varied between 0° and 30° to facilitate, for example, specific applications or use with the auxiliary handle discussed below.

With reference now briefly to FIG. 4, an alternate embodiment 28' of the tines or spikes 28 is illustrated. The alternate embodiment spike 28' defines a chisel point and, as such, includes two opposed, flat surfaces 34 disposed at an acute angle to one another, and arranged symmetrically relative to the axis of the tine or spike 28'.

The weeding tool 10 is primarily intended for use by a person in a kneeling position. However, it is anticipated there will be users and specific situations in which the weeding tool 10 will be more easily and efficiently used by a person in a standing position. Accordingly, and with reference to FIGS. 5 and 6, it will be appreciated that an auxiliary handle assembly 40 may be utilized with the weeding tool 10. The auxiliary handle assembly 40 includes an elongate tubular handle portion 42 having a length of between two and four feet (0.61 m to 1.22 m). The handle portion 42 is preferably hollow and is fabricated of metal. If desired, however, the handle portion 42 may be solid and may be made of plastic or wood.

Adjacent the lower end of the auxiliary handle 40 is a bend or curve 44. The angle of the bend 44 is preferably about 30° but may be as small as 10° or as great as 50°. The bend 44 in the auxiliary handle 40 facilitates use of the weeding tool 10 with the auxiliary handle 40 as will be explained more fully below. As noted, the handle portion 42 is hollow and a short, lower region 46 below the bend 44 defines an inside diameter which is just slightly larger than the outside diameter of the handle assembly 12. Thus, the short, lower region 46 of the auxiliary handle 40 may axially receive the handle assembly 12 of the weeding tool 10. The auxiliary handle assembly 40 thus effectively extends the length of the handle assembly 12 of the tool 10 and facilitates its use by a standing user.

The auxiliary handle assembly 40 may be positively though removably secured to the weeding tool 10 by a linchpin 50 which is received transversely through aligned openings 52 adjacent the end of the lower portion 46 and a suitably sized and positioned opening 54 (also illustrated in FIG. 1) in the body portion 14 adjacent the handle assembly 12. The linchpin 50 includes a captive ring 56 which facilitates gripping and insertion and removal of the linchpin 50 by manual means. The linchpin 50 also includes a spring biased latch 58 which retains the linchpin 50 in the position illustrated in FIG. 4. In order to separate the auxiliary handle assembly 40 from the weeding tool 10, the linchpin 50 is removed by pulling on the ring 56. Resolved force components on the latch 58 drive it inwardly, thus releasing the linchpin 50 and permitting its removal from the tube 46. The auxiliary handle assembly 40 may then be readily removed from the handle assembly 12 of the weeding tool 10. To reattach the auxiliary handle assembly 40, the above steps are undertaken in the reverse order.

Operation of the weeding tool 10 will now be described with reference to FIG. 2. A weed 62 such as a dandelion growing in the soil 64 is to be removed or extracted. The spikes 28 are inserted into the soil 64 such that the roots 66 of the weed 62 are received within one of the spaces 30 between the spikes 28. The spikes 28 of the weeding tool 10 are then pushed into the soil 64 until the body portion 14 contacts the soil 64. The weeding tool 10 is then moved from the position in FIG. 2 illustrated in solid lines to the position illustrated in phantom lines with the body portion 14 remaining in contact with the soil 64.

The elliptical shape of the body 14 ensures that during the initial phase of the weed 62 extraction, significant mechanical advantage is achieved inasmuch as the first class lever defined by the long distance between the handle assembly 12 and the contact (pivot) point of the body portion 14 with the soil 64 and the short distance between such contact point and the location of the weed 62 within the spikes 28 multiplies the force applied while requiring the handle assembly 12 to be moved through a relatively long arc. As the weed 62 is removed and the pivot point shifts along the length of the body portion 14 from the enlarged terminal portion 26 toward the handle assembly 12, the ratio between the lengths of the lever arms changes. Thus, the mechanical advantage reduces but the relative speed at which the weed 62 is extracted increases. Such changing lever arm length and thus changing mechanical advantage as the tool 10 is moved from the position generally illustrated in solid lines in FIG. 2 to the position illustrated in phantom lines and farther, is a significant feature and advantage of the elliptical shape of the body portion 14 of the weeding tool 10 and its overall configuration.

The operation of the tool 10 with the auxiliary handle assembly 40 is substantially the same except that the user will be standing rather than kneeling as will typically be the case when using the tool 10 without the auxiliary handle 40. It will be appreciated that the bend 44 ensures that the handle portion 42 will be oriented and utilized in a generally vertical position, that is, the handle portion will not need to be positioned or moved to a significant angle from the vertical during a typical weed removal operation.

The foregoing disclosure is the best mode devised by the inventor for practicing this invention. It is apparent, however, that apparatus incorporating modifications and variations will be obvious to one skilled in the art of hand tools and weed removal. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A hand tool for removing weeds comprising, in combination,
   a user engageable handle including a pair of semi-circular handle portions each having a width, said pair of handle portions defining a hand engageable surface,
   a curved body portion having a pair of ends, one of said ends of said body portion defining a flat extension of said curved body portion, said flat extension having a width equal to said width of each of said handle portions, and
   a weeding head disposed at the other of said opposed ends of said body portion, said weeding head including at least three parallel spaced-apart elongate tines defining a plurality of weed receiving spaces between said tines, said weed receiving spaces having substantially constant width along said tines
   whereby a weed may be engaged within one of said plurality of weed receiving spaces and said tool may be rocked rearwardly on said curved body portion to lift said weed.

2. The hand tool of claim 1 wherein said handle is substantially cylindrical.

3. The hand tool of claim 1 wherein said body potion is substantially elliptical.

4. The hand tool of claim 1 wherein said tines define chisel points.

5. The hand tool of claim 1 wherein said tines define conical points.

6. The hand tool of claim 1 wherein said tines are four in number and define three spaces therebetween.

7. The hand tool of claim 1 wherein said tines are between two and one-half and four inches long.

8. The hand tool of claim 1 wherein said tines are oriented at an angle of between 0° and 30° relative to said handle.

9. The hand tool of claim 1 further including an auxiliary handle assembly for disposition on said handle, said auxiliary handle assembly including a cylindrical tube having an inside diameter slightly greater than the diameter of said handle and means for selectively coupling said auxiliary handle assembly to said handle.

10. The hand tool of claim 8 wherein said coupling means is a pin and transverse openings are disposed in said cylindrical tube and said handle which may be aligned to receive said pin.

11. A weed removing hand tool comprising, in combination,
   a curved body portion having a pair of ends, a flat handle extension having a width and disposed at one of said ends and a weeding head at the other of said ends,
   grip means extending longitudinally for engagement by the hand of a user on said handle extension of said body portion, said grip means including a pair of semi-circular handle portions secured to said flat handle extension, each of said handle portions having a width equal to said width of said flat handle extension, and
   at least three elongate, parallel weeding spikes disposed on said weeding head, said spikes disposed at an acute angle relative to said handle extension.
   said at least three spikes defining at least two elongate weed receiving slots between adjacent said spikes, said weed receiving slots having substantially constant width along their length.

12. The weed removing hand tool of claim 11 wherein said spikes each define a diameter and said spikes are each fixedly spaced apart a distance substantially equal to said diameter.

13. The weed removing hand tool of claim 11 wherein said acute angle is between about 0° and 30°.

14. The weed removing hand tool of claim 11 wherein said spikes are four in number and define three spaces therebetween.

15. The weed removing hand tool of claim 11 wherein said curved body portion is substantially elliptical.

16. The weed removing hand tool of claim 11 wherein said spikes are between two and one-half and four inches long and define tapered terminal portions.

17. The weed removing hand tool of claim 11 further including an auxiliary handle assembly for engaging said grip means, said handle assembly having a tube for receiving said grip means and means for selectively coupling said handle assembly to said grip means.

18. The weed removing hand tool of claim 11 wherein said weeding head is wider than said curved body portion.

19. A hand tool for removing weeds from soil comprising, in combination, a substantially elliptically curved body portion having a handle end and a weeding end, an elongate user engageable handle having an end joining said handle end of said body portion, said user engageable handle having a generally cylindrical grip including a centrally disposed flat extension of said curved body portion and an opposed pair of semi-circular handle portions secured to said flat extension, and weeding means coupled to said weeding end of said body portion, said weeding means including at least three elongate, spaced-apart, parallel tines defining weed receiving spaces therebetween, said tines having tapering ends and disposed at an acute angle relative to said cylindrical grip, said weed receiving spaces having substantially uniform width along their length.

* * * * *